United States Patent

[11] 3,594,725

[72] Inventor Glenn G. Clinard
Upland, Calif.

[21] Appl. No. 773,111
[22] Filed Nov. 4, 1968
[45] Patented July 20, 1971
[73] Assignee General Dynamics Corporation

[54] INTERLACED ELECTRONIC COMMUTATOR HAVING PLURAL SUBCOMMUTATORS
10 Claims, 7 Drawing Figs.

[52] U.S. Cl. .......... 340/147, 340/163
[51] Int. Cl. .......... H04q 5/00
[50] Field of Search .......... 340/147 C, 147 CN, 147 CV, 147

[56] References Cited

UNITED STATES PATENTS

| | | | |
|---|---|---|---|
| 3,016,516 | 1/1962 | Doersam | 340/147 C |
| 3,018,449 | 1/1962 | Farrelly | 340/147 CPI |
| 3,103,001 | 9/1963 | Hage | 340/147 CPI |
| 3,270,321 | 8/1966 | Berowitz | 340/147 C |
| 3,364,466 | 1/1968 | Stine | 340/147 CPI |

*Primary Examiner*—Harold I. Pitts
*Attorneys*—Robert F. Rotella and Edward B. Johnson

ABSTRACT: An interlaced electronic commutator system having use in a time division multiplex system. A timing circuit and a plurality of subcommutator circuits are employed, each one of which periodically gates input data for a relatively long period of time, isolates the gated input data, then gates only the last portion of the isolated input data as the subcommutator output. The outputs of all the subcommutators are then combined in a high rate pulse amplitude modulated waveform.

INVENTOR.
GLENN G. CLINARD
BY
Carl R. Braun
ATTORNEY

INVENTOR.
GLENN G. CLINARD

BY Carl R. Brown

ATTORNEY

INVENTOR.
GLENN G. CLINARD

BY Carl R. Braun

ATTORNY

INVENTOR.
GLENN G. CLINARD

BY Carl R. Brown

ATTORNEY

INTERLACED ELECTRONIC COMMUTATOR HAVING PLURAL SUBCOMMUTATORS

BACKGROUND OF THE INVENTION

There are several known electronic commutator systems that time-divide data into a pulse amplitude modulated waveform that, for example, is particularly used in telemetering transmission systems. These conventional electronic commutators, which normally utilize an isolation amplifier between a set of electronic switches and the output, have limitations at higher output rates, because as the source resistance of the data voltage increases and the speed of commutations increases, the output cannot change levels fast enough to provide an accurate output due to the capacitance of the switches and the stabilizing time of the isolation amplifier. As a result there is a degradation of the output that limits the conventional-type electronic commutators to slower commutation rates.

The conventional type electronic commutators generally follow two basic approaches. One is the parallel gate approach and the other approach uses multiple level gating with a "-tree" or "row and column" matrix. Other systems employ a sample and hold approach that uses a capacitor at the output of the isolation amplifier to provide a stored output from the isolation amplifier. However in each approach, switches and a single isolation amplifier are normally employed to commutate all the input data and the PAM output is subject to degradation as the source of impedance and commutation rate increases. Thus the accuracy of the output of the conventional type electronic commutators is dependent upon the speed of conversion.

Therefore it is advantageous to have an electronic commutator system that time-divides input data into an output having a high rate of commutation, while achieving isolation between the input and output through use of isolation means that is allowed to "settle out" to a final value before being gated.

SUMMARY OF THE INVENTION

In a specific illustrative embodiment of this invention, a plurality of subcommutators, each having an isolation amplifier, are strobed by timing pulses to gate input data to its respective isolation amplifier, with relative long and overlapping time sequences. The next periodic pulse gates the stabilized output of the isolation amplifier to the common output line of the commutator system. Accordingly while the commutators gate the input data from given input lines to the isolation amplifiers at a relatively slow rate, which for the several subcommutators creates an overlapping time sequence, the output of the isolation amplifiers are gated to the output line for only a short period of the time each isolation amplifier is connected to the input line. Thus the outputs of all the subcommutators are strobed by the timing pulses to provide a PAM output. So only the "settled out" output of the isolation amplifier is gated to the output line. The interlaced electronic commutators is thus able to sample a data source for a much longer time, isolate the data source with an isolation amplifier, then gate the isolated output for only the last portion of the time the sample is impressed upon the isolation amplifier. The outputs of the several subcommutators operating at slow rates are interlaced into a high rate output.

In the specific illustrative embodiments, the interlaced commutator comprises eight subcommutators and a timing circuit. Each subcommutator comprises a counter, sets of gates, an isolation amplifier, and an output gate. The timing circuit contains an oscillator, a high speed counter, and decoder gates that provide a basic clock frequency that sequences the subcommutators. The phases of the subcommutators are staggered by one fast clock pulse to each subcommutator. The output of the subcommutators are scanned at the fast clock rate by the next succeeding clock pulse to each subcommutator that in turn advances the subcommutator to the next input line. The outputs of the subcommutators are scanned by the clock pulse gating output gates that enables the subcommutators to inject their own output at the proper time into the output composite signal of the interlaced commutator system. In the timing sequence, each isolation amplifier is connected through input gates to the data input for a period of time equal to eight clock pulses of the number of subcommutators, and its output is gated for a time period of one clock pulse at the end of the input gate time period. Thus the isolation amplifier output has ample time to "settle out" to its final value, even though the outputs of the plurality of subcommutators are gated at a very high speed.

While the interlaced commutator employs more than one isolation amplifier, each of the subcommutator circuits have a relatively simplified circuit that is the same for each subcommutator. Also the system has a reduction of the analog data interconnections and the rise time of the output is only limited by the gate turn-on times, which are very fast, and the output rise time is independent of both data source impedance and the isolation amplifier rise time.

It is therefore an object of this invention to provide a new and improved commutator circuit.

It is another object of this invention to provide a new and improved interlaced commutator for use in high speed, accurate time-division multiplexing systems.

It is another object of this invention to provide a new and improved interlaced commutator for time-dividing data, which commutator has longer available input rise times, has level outputs regardless of changing data during channel time, and employs commutators in which commutator switching transients are minimized.

It is another object of this invention to provide a new and improved interlaced commutator in which higher input data impedances can be used, higher clock rates can be used, simpler and less expensive amplifiers, with slower rise-times, can be used, and in which the output rise-time is independent of data source impedance or amplifier rise-time.

Other objects, novel features, and advantages will become more apparent upon a review of the following detailed specification and an examination of the drawings in which.

Figure 1:
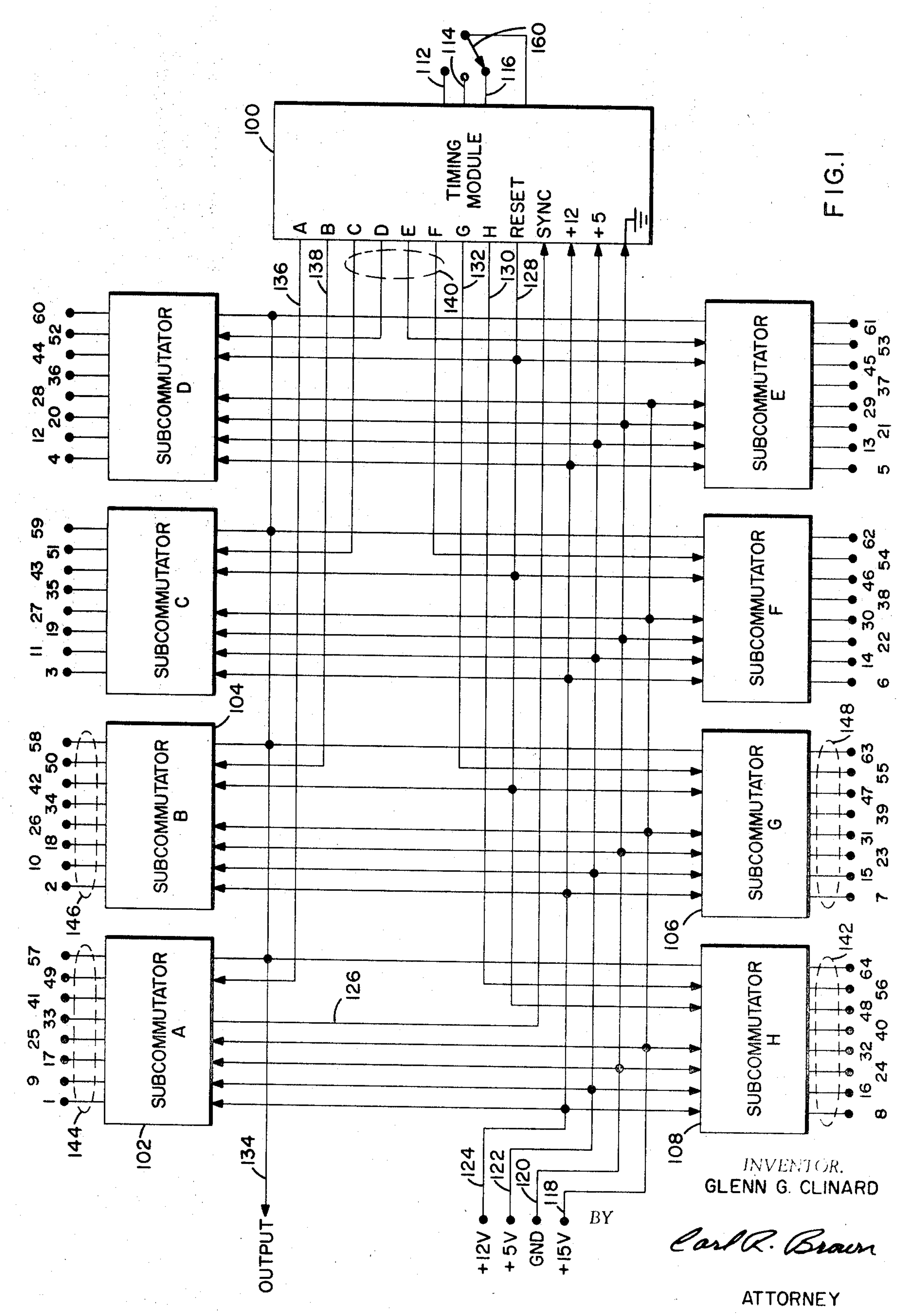
FIG. 1 is a block diagram of an embodiment of the interlaced electronic commutator of this invention.

Referring now to FIG. 1, an interlaced commutator system is illustrated using an 8-channel subcommutator system to achieve 64 channels of data gating. A timing module 100 individually sequences output pulses through lines 136, 138, 140, 132, and 130 to the respective subcommutators A, B, C, D, E, F, G, and H. The timing pulses have a set periodic timerate that for purposes of this explanation is 40 microseconds and for purposes of this embodiment are negative directed pulses. Each of the timing pulses gates a particular subcommutator input line, for example line 1 of input lines 144 of subcommutator 102, that supplies analog data to a common output line 134. Lines 118, 120, 122, and 124 supply the appropriate potentials for use in the illustrative embodiment. Line 128 provides the output reset pulse that resets all the counter circuits in the subcommutators in a manner that will be described in more detail hereinafter, and line 126 supplies the synchronizing pulse to the timing module 100 that initiates the output reset pulse.

Figure 2:
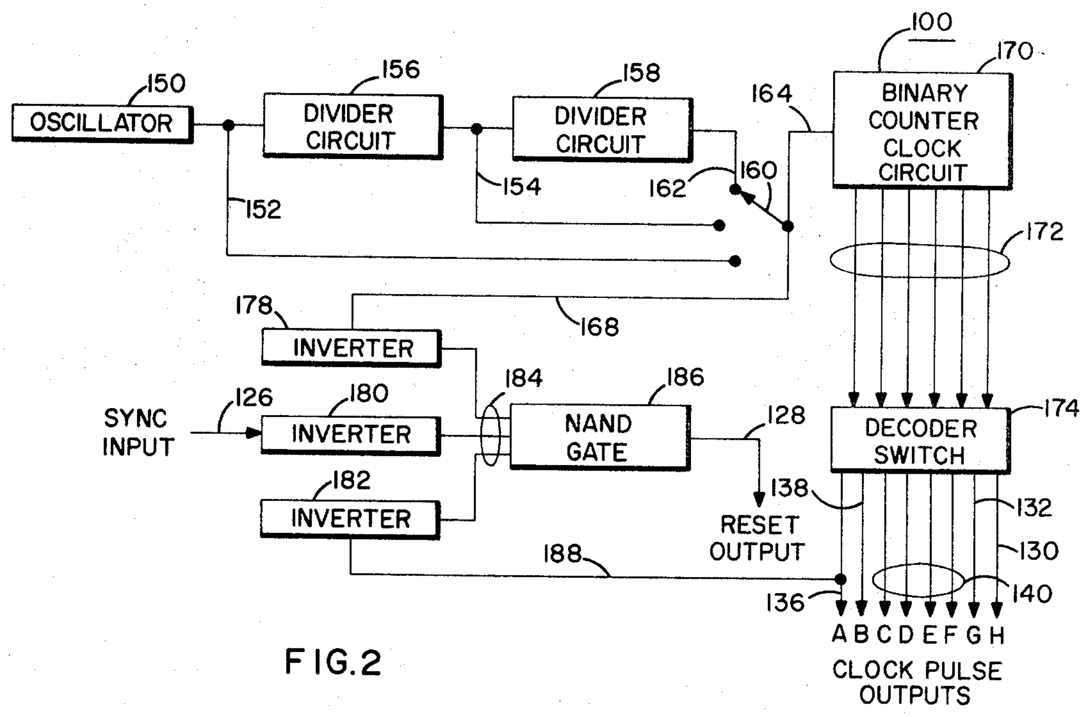
FIG. 2 is a block diagram of the timing circuit employed in the embodiment illustrated in FIG. 1.

The timing module 100, see FIG. 2, comprises an oscillator 150 that may be a free-running oscillator providing a 100 kHz. output signal. The output signal is supplied through lines 152, 154, and 162 as determined by the position of switch 160. Each of the divider circuits 156 and 158, divide the input frequency by two. Thus the output signal to lines 164 and 168 through switch 160 will be 100 kHz. when switch 160 is closed to line 152, 50 kHz. when switch 160 is connected to line 154, and 25 kHz. when the switch 160 is connected to line 162. In this particular example, the switch 160 is connected to the line 162 and thus the output frequency to lines 164 and 168 is 25 kHz. The 25 kHz. output signal in line 164 is fed to a known 3-bit binary counter clock circuit 170 that employs known techniques to provide eight successive output pulses of 40-microsecond duration through line 172 to the decoder switch circuit 174. The known 3-bit binary counter clock circuit 170 continues to provide output pulses in a continuous resetting count in response to the input frequency signal in line 164. The decoder switch circuit 174 employs known techniques, as for example three input NAND gates that supply strobe or timing pulses of approximately 40-microsecond duration for the 25 kHz. input signal to output lines 136, 138, 140, 132, and 130. These output pulses are individually and successively applied as negative directed pulses to subcommutators A, B, C, D, E, F, G, and H in a continuous repeating sequence by the matrix illustrated in FIG. 1.

Figure 6:
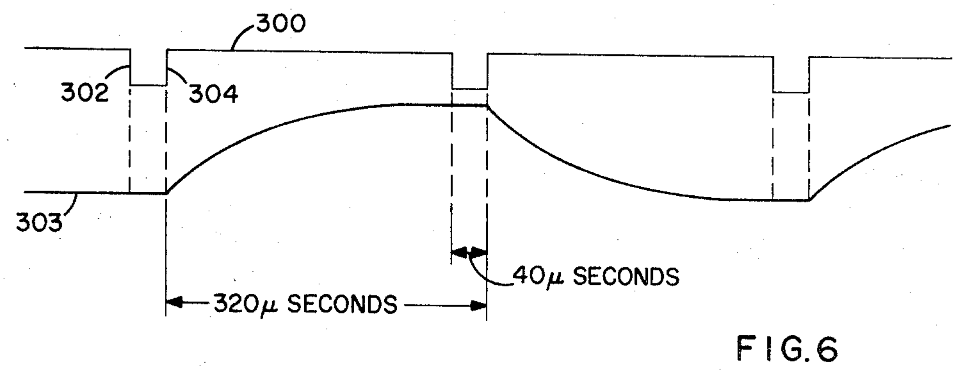
FIG. 6 is a schematic diagram of the relationship between the timing pulses supplied to each subcommutator and the sequencing of the gated output analog information.
Figure 3:
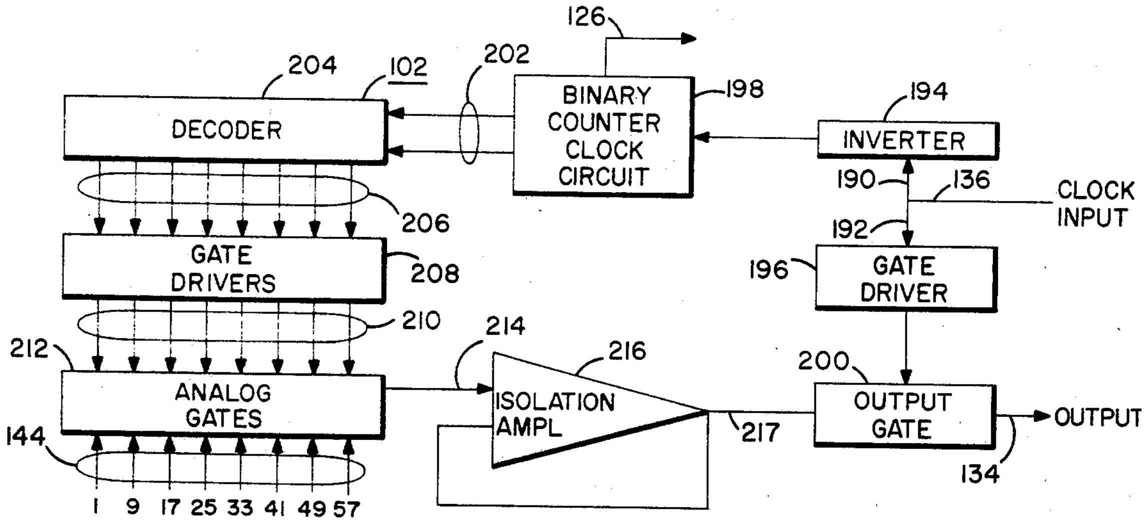
FIG. 3 is a block diagram of a subcommutator circuit employed in the embodiment illustrated in FIG. 1.

Each of the subcommutator circuits, such as subcommutator 102, see FIG. 3, has an input line 136 that supplies the clock or strobe input pulse to lines 190 and 192. The timing pulse, having a negative directed pulse wave form 300, passes through the inverter 194 to a known 3-bit binary counter clock circuit 198. The binary clock circuit 198 is responsive to the positive going portion 302 of the timing pulse 300 or the trailing edge 304, see FIG. 6, as inverted by inverter 194. Thus in response to the trailing edge of the timing pulse 300, the 3-bit binary counter clock circuit 198 increases one count and supplies a coded output clock signal to the decoder circuit 204. The decoder 204 decodes the binary counter clock signal into a particular channeled holding signal through one of lines 206, to the gate driver circuit 208 that in turn supplies a gating signal through lines 210 to the analog gates 212. The gating signal closes a particular analog gate of analog gates 212, that connects a given one of input lines 144 to the isolation amplifier 216 through line 214. The decoder 204 may comprise eight, three-input NAND gates that decode the binary counter clock circuit output in line 202 into eight sequential pulses. The gate drivers 208 and analog gates 212 comprise eight gating channels that successively close the input lines 144 to the isolation amplifier 216.

Figure 4:
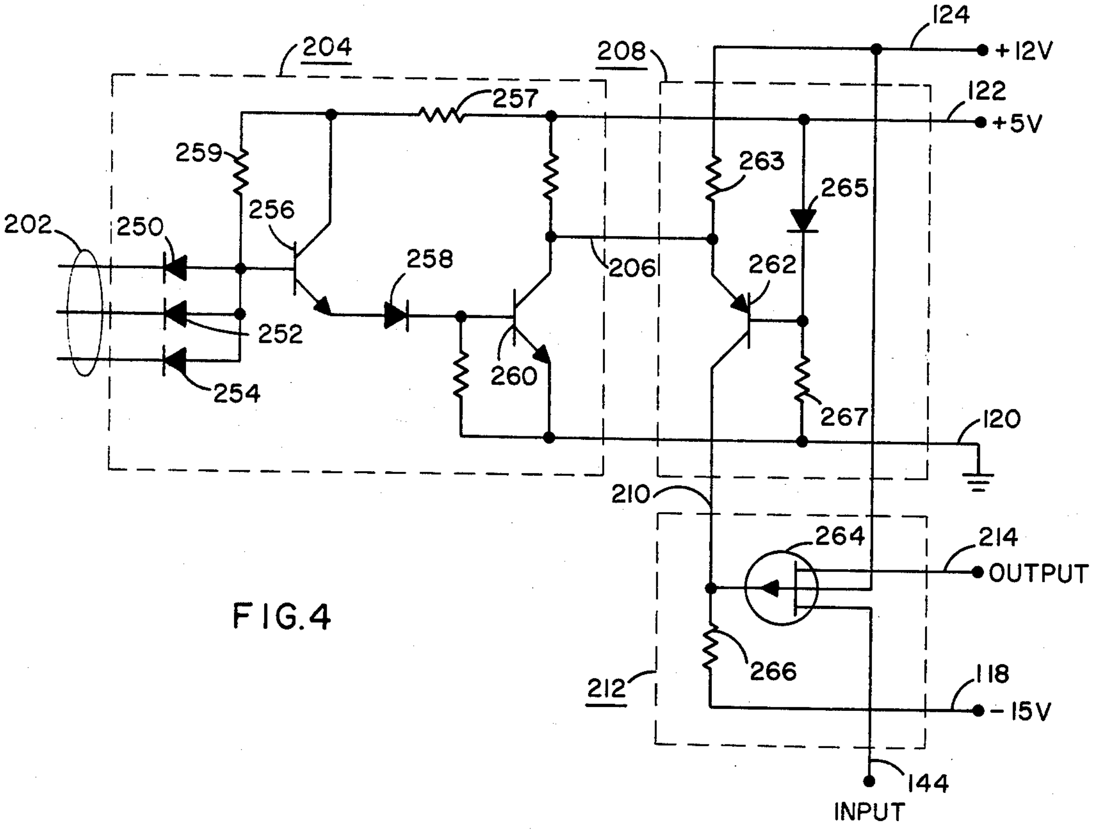
FIG. 4 is a schematic diagram of a decoder, gate driver, and analog gate as employed in the subcommutator.

The decoder circuit 204, gate drivers 208, and analog gates 212 comprise eight channel circuits, one of which is illustrated in FIG. 4. The input signal in lines 202 from the binary counter clock circuit 198 is applied to the three unidirectional devices 250, 252, and 254 that, in conjunction with resistors 257 and 259, transistor 256 and unidirectional device 258, forms a NAND gate. In the gate driver portion 208 of the circuit, the transistor 262 functions as a PNP gate driver and provides an interface between the input logic and the analog gate circuit 212 as well as providing in one common base stage the necessary voltage levels to energize the field-effect transistor 264 to gate the output 214. When one of the input signals in lines 202 is low, then the output of NPN transistor 256 is cut off. In this condition, the diode 265 and resistor 267 holds the base of transistor 262 at approximately 5 volts minus the voltage drop across the diode 265. The emitter of transistor 262 is therefore at approximately 5 volts. The voltage output of transistor 262 is determined by the resistance values of resistors 263 and 266 and the drop across these resistors. This drop is independent of the input circuit and the output circuit. In this condition, the voltage in line 210 is insufficient to turn on the field-effect transistor 264. Upon receiving three pulses in line 202 that energize the NAND gate, transistor 260 is energized providing an output voltage through line 206 that pulls the emitter of transistor 262 below the voltage of the base, turning off transistor 262 and causing the voltage in line 210 to rise to −15 volts through the input voltage line 118. This minus 15 volts is sufficient to turn on the field effect transistor 264 and close the analog gate circuit 212 to the input in line 144. In this embodiment, the field effect transistor 264 is a metal-oxide semiconductor, field-effect transistor.

Figure 7:
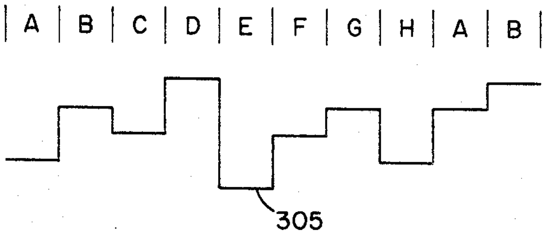
FIG. 7 is an illustration of the timing pulses to each subcommutator in relationship to the gated analog output data of the composite interlaced commutator system.

As previously described, in each subcommutator circuit, see FIG. 3, the analog gate closes a particular input line of input lines 144 for each input clock pulse received through line 136. The input clock pulses are supplied to the input line of each subcommutator circuit, such as input line 136 to subcommutator A, every eighth clock pulse while the clock pulse 302 has a timespan of about 40 microseconds, the spacing between clock pulses to each subcommutator is 320 microseconds. Accordingly, the clock pulse in line 136 causes the binary counter circuit 198 to move one count that through the decoder 204, gate drivers 208, and analog gates 212, gates a particular input line 144 for 320 microseconds until the subcommutator A receives the next clock pulse through line 136. Thus the field-effect transistor 264 in FIG. 4 is energized for each input line 144 successively for about 320 microseconds, and thus the input analog information passes through lines 144, and line 214 to the isolation amplifier 216 for the 320-microsecond timespan. The isolation amplifier 216, which is a known isolation amplifier that may comprise an operational amplifier that minimizes the effect of the output circuit on the input circuit, requires a certain period of time to stabilize its output to its input analog signal. The 320 microseconds that the data signal is connected through the analog gates 212 to the isolation amplifier 216, allows the output of the isolation amplifier to stabilize to the input data signal. The output of the isolation amplifier in line 217 is gated by output gate 200 to common output line 134. The output gate 200 is opened by a signal from the gate driver 196 in response to the clock pulse in line 192. The gate driver circuit 196 and the output gate circuit 200 comprise a gate driver circuit and an output gate circuit such as described relative to the gate driver circuit 208 and the analog gate circuit 212 of FIG. 4. The output gate circuit 200 utilizes the MOS–FET circuit that provides isolation from the input circuit and is open during the time period of the input clock pulse 302 or for about 40 microseconds. The timing of the circuit is such that the input clock pulse 302 opens the output gate 200 at the end of the 320-microsecond period that the respective analog gate 212 is open to one of the lines 144. Thus gate 200 gates the output of the isolation amplifier 216 at the time when the analog output in line 217 has stabilized, see FIG. 6. The waveforms of the analog signal 303 are fed to the isolation amplifier 216 by the respective gated input lines 144 and is stabilized through the isolation amplifier 216 and gated at its stabilized point by the gating pulse 302. Since each of the subcommutators successively receive the gating pulses, each of the subcommutators A, B, C, D, E, F, G, and H provide an analog output signal 305 in sequence, as illustrated in FIG. 7, to line 134. Since the binary counter clock circuit 198 is responsive to the trailing edge of the input pulse 302, the input counter circuit 198 advances one count after the output gate 200 has opened and is closing. Thus each of the input lines 1 through 64 of the subcommutators are periodically opened to the isolation amplifier 216 for each subcommutators circuit, which input is stabilized and gated at the end of its stabilized period to the common output line 134.

Figure 5:
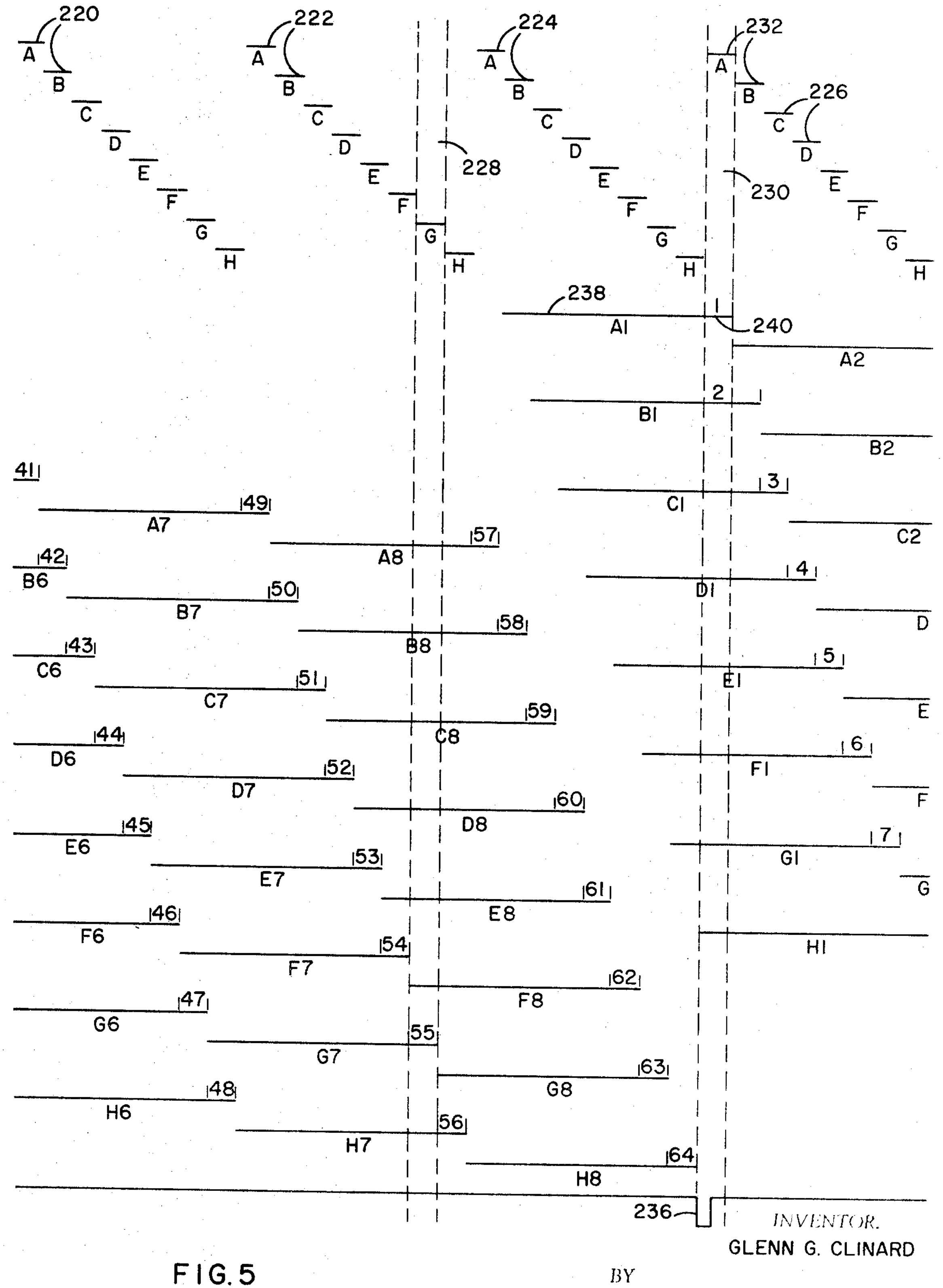
FIG. 5 is a timing diagram of the interlaced electronic commutator.

Referring to FIG. 5, the timing diagram illustrates the respective timing of the series of clock pulses 220, 222, 224, and 226 to each of the respective subcommutator circuits. The first clock pulse A of the 220 series, for example, gates line 49 of subcommutator A to the isolation amplifier 216. The first clock pulse A of the next succeeding series 222 to subcommutator A gates the analog signal in line 49 to output line 134 and advances the binary counter clock circuit 198 one count to gate line 57 through the analog gates 212 to the isolator amplifier 216. The same clocking of the input lines of each of the subcommutators occur in the same manner. Dotted lines 228 and 230 illustrate the respective timing relationships of each clock pulse.

The system is phased in its timing sequence to data line 1 of lines 144 of the subcommutator A to reset the binary clock circuits of each of the subcommutators at the end of gating data line 64 through subcommutator H and the start of the clock pulse to subcommutator A that gates data line 1. The binary counter 198 of subcommutator A, see FIG. 3, provides a synchronizing output pulse in line 126 when the appropriate clock input pulse is received for gating input line 1. This sync pulse is fed to the timing module 100, see FIG. 2, where it is fed through inverter 180 to the NAND gate 186. The NAND gate 186 is responsive to a frequency pulse through line 168 and through inverter 178. An output clock pulse in line 136 of the decoder switch 174 through inverter 182 provides the combination input sequence in lines 184 that gates an output reset pulse through line 128 to each of the subcommutator binary counter clock circuits 198 of subcommutators B, C, D, E, F, G, and H. This resets each of the counts in the binary counter clock circuits to the first data line of, for example, data lines 146 of subcommutator 104, data lines 142 of subcommutator 108 and data lines 148 of subcommutator 106. The binary counter clock circuits of the respective subcommutator circuits are reset without interrupting the particular gated circuit that is gating the data line to the isolation amplifier circuit at the particular time. Thus the sync pulse 236 of FIG. 5 allows the timing and gating sequence of the 64 data lines of the subcommutator circuits to continuously apply 40-microsecond output analog signals to the common output line 134.

In operation, the input lines 1 through 64 of the subcommutator circuits are connected to analog signal sources to be commutated. The appropriate timing of the subcommutator circuits is set by switch 160 to the desired frequency. This frequency may be selectively set to correspond to the desired commutating time and the time required for stabilizing the respective isolation amplifiers in the subcommutator circuits. The first pulse through line 136 to subcommutator A creates a return sync signal through line 126 that initiates a reset output pulse in line 128 that correctly phases all of the binary counter clock circuits in the subcommutators. The binary counter circuit 170 and the decoder switch 174 of the timing module 100 then provide successive output pulses through lines 136, 138, 140, 132, and 130 to the subcommutators that, as previously described relative to FIG. 5, successively interrogate each of the respective input lines 1 through 64 with a relatively long opening of the gate to the respective isolation amplifiers. A terminating gate pulse gates the analog information from the respective individual data lines of each subcommutator in the stabilized output to line 134 in an interlaced system in which several of the gates of the subcommutators are open to individual lines simultaneously. The shorter period outputs are gated in continuous time sequence providing the continuous analog output signal to line 134.

It should be understood that this invention permits the use of several subcommutators running at slower rates to produce a fast rate equivalent commutator output by interlacing the outputs of the several subcommutators near the end of their sampling periods to produce a standard format pulse amplitude modulated waveform. The interlaced commutator can be used in instrumentation space, missiles, aircraft and industry, in PAM telemetry or as the multiplexer or scanner used in pulse-code-modulation systems.

Having described my invention, I now claim:

1. An interlaced electronic commutator for commutating a number of varying analog signals comprising, a plurality of data input lines, plurality of subcommutator means each connected to said plurality of data input lines for periodically commutating data signals from said data input lines, timing means connected to said subcommutator means for supplying timing pulses in sequence to each of said subcommutator means in a repetitive periodic sequence, said timing means including a frequency source, first clock circuit means connected to said frequency source and responsive thereto, decoder means connected to said first clock circuit means and responsive thereto for applying one timing pulse at a time to each of said subcommutator means, reset pulse circuit means connected to said frequency source and to said decoder means and to each of said subcommutator means for providing a reset pulse to each of said subcommutator means, each of said subcommutator means including an isolation amplifier, an output line, first inverter circuit means connected to said timing means and responsive thereto, second clock circuit means connected to said first inverter circuit means for supplying a coded output clock signal and a synchronizing signal, first gate means connected to said second clock circuit means and to said isolation amplifier and responsive to a first one of said timing pulses from said timing means for gating a data signal in one of said data input lines to said isolation amplifier, and a second gate means connected to said timing means and to said isolation amplifier and responsive to a second one of said timing pulses from said timing means for gating the output of said isolation amplifier for the time period of said second one of said timing pulses to said output lines of said subcommutator means.

2. The interlaced electronic commutator defined in claim 1, wherein said reset pulse circuit means of said timing means includes second inverter circuit means connected to said frequency source and responsive thereto, said second inverter means having an output; third inverter circuit means connected to said subcommutator means to receive said synchronizing signal, said third inverter means having an output; fourth inverter circuit means connected to said decoder means to receive a timing pulse, said fourth inverter circuit means having an output; and NAND gate circuit means connected to said outputs of said second, third and fourth inverter circuit means and responsive to the combination input sequence from said second, third and fourth inverter circuit means for providing a gated reset pulse to said subcommutator means.

3. The interlaced electronic commutator defined in claim 1, wherein said first gate means of said subcommutator means includes a decoder circuit that decodes the output of said second clock circuit means and sequentially channels output signals; a first gate driver circuit connected to said decoder circuit and responsive to said sequentially channelled output signals; and an analog gate circuit connected to said first gate driver circuit and to said isolation amplifier, said analog gate circuit responsive to the output of said first gate driver circuit.

4. The interlaced electronic commutator defined in claim 1, wherein said second gate means of said subcommutator means includes a second gate driver circuit responsive to said timing pulses from said first clock circuit means and an output gate circuit operably connected to said second gate driver circuit.

5. The interlaced electronic commutator defined in claim 1, wherein said first clock circuit means is a 3-bit binary counter clock circuit.

6. The interlaced electronic commutator defined in claim 1, wherein said second clock circuit means is a 3-bit binary counter clock circuit.

7. The interlaced electronic commutator defined in claim 3 wherein said decoder circuit includes a plurality of NAND gates.

8. The interlaced electronic commutator defined in claim 3 wherein said plurality of analog gates each comprise a field effect transistor circuit.

9. An interlaced electronic commutator for commutating a number of varying analog signals comprising:

a plurality of data input lines;

a plurality of individual subcommutator means each connected to said plurality of data input lines for periodically commutating data signals from said data input lines;

timing means connected to each of said subcommutator means for supplying timing pulses in sequence to each of said subcommutator means in a repetitive periodic sequence, said timing means including a frequency source, first binary counter clock circuit means connected to said frequency source and responsive thereto, decoder means connected to said first clock circuit means and responsive thereto for applying one pulse at a time to each of said subcommutator means, reset pulse circuit means connected to said frequency source and to said decoder means and to each of said subcommutator means for providing a reset pulse to each of said subcommutator means;

each of said subcommutator means including an isolation amplifier; an output line; first inverter circuit means connected to said timing means and responsive to a first one of said timing pulses from said timing means; second binary counter clock circuit means connected to said inverter circuit means for supplying a coded output clock signal and a synchronizing signal; a decoder circuit connected to said second clock circuit means that decodes the output of said second clock circuit means and sequentially channels output signals; a first gate driver circuit connected to said decoder circuit and responsive to said sequentially channelled output signals; an analog gate circuit connected to said first gate driver circuit and to said isolation amplifier, said analog gate circuit responsive to the output of said first gate driver circuit for gating a data signal in one of said data input lines to said isolation amplifier; a second gate driver circuit connected to said timing means and responsive to a second one of said timing pulses from said timing means; and an output gate circuit operably connected to said second gate driver circuit and to said isolation amplifier and responsive to said second one of said timing pulses for gating the output of said isolation amplifier for the time period of said second one of said timing pulses to said output line of each of said subcommutator means.

10. The interlaced electronic commutator defined in claim 9, wherein said output gate circuit is a field-effect transistor circuit.